Karl F. Ross
INVENTOR.

Karl F. Ross
INVENTOR.

United States Patent Office 3,378,839
Patented Apr. 16, 1968

3,378,839
RADIOLOCATION SYSTEM
Karl F. Ross, 5121 Post Road, Riverdale, N.Y. 10471
Filed Feb. 3, 1967, Ser. No. 613,887
10 Claims. (Cl. 343—11)

ABSTRACT OF THE DISCLOSURE

The invention relates to a radiolocation system wherein incoming high-frequency waves, externally generated or locally transmitted and externally reflected, impinge upon a polygonal array of parallel receiving antennas which are grouped in several pairs. Upon cophasal reception of incoming wave energy by the antennas of a given pair, as determined by a respective phase-comparison circuit connected thereto, the direction of the origin of this wave energy is established as lying substantially in a plane bisecting the imaginary line which interconnects the particular antenna pair. Advantageously, the array of receiving antennas is rotated, unidirectionally or oscillatingly, at a relatively slow rate to allow phase comparisons to be made also in intermediate positions separated by only a small fraction of the angular spacing of the connecting lines of successive antenna pairs. If the wavelength of the incoming radiation is smaller than the largest spacing of any paired receiving antennas, a modulation (in amplitude or frequency) of sufficiently larger wavelength may be impressed upon the high-frequency carrier. A set of deflecting coils, arrayed about the axis of a cathode-ray tube in a pattern similar to that of the receiving antennas, may be used for panoramically indicating the location of the origin of radiation received. In a simplified version, a single pair of antennas may be rotated in synchronism with a single coil (or pair of coils) or other beam-deflecting means.

---

My present invention relates to a radiolocation system for determining the azimuthal angle, relative to a predetermined reference direction, of the direction of incidence of high-frequency waves which may be externally generated or locally transmitted and reflected by an external object.

The general object of this invention is to provide a system for the purpose described which is capable of making such azimuthal determination with great accuracy even without the use of highly directive receiving antennas.

A more particular object of my invention is to provide means in such system for faithfully displaying the information so obtained on a panoramic indicator, advantageously in conjunction with a conventional generator of outgoing radar pulses to establish not only the direction but also the range of a reflecting body.

An important feature of my invention resides in the provision of a polygonal array of parallel receiving antennas grouped in several pairs, each antenna being preferably common to two or more of these pairs. Each pair works into an individual phase-comparison circuit which, upon detecting a cophasal relationship in the output voltages of the two paired antennas, selectively energizes an associated indicator element to establish the location of the origin of the incoming radiation as substantially in a plane bisecting an imaginary line which interconnects that antenna pair.

The ascertainment of a cophasal relationship, in order to be nonambiguous, requires that the wavelength of the received radiation be larger than the spacing of any two paired receiving antennas of the array. If the basic wavelength is too short for this purpose, the high-frequency radiation may be treated as a carrier for a modulation (in amplitude or in frequency) of suitable wavelength which is detected in the output of each antenna before this output is applied to the associated comparison circuit. If each receiving antenna has a directive pattern extending over not more than 180°, the azimuthal determination will be unequivocal; if incident waves are expected from only one-half of the horizon, e.g. because of the directivity of an associated transmitting aerial, the antennas could also be omnidirectional without objectionable ambiguity.

In accordance with another major feature of my invention, the array of receiving antennas is rotated about an axis parallel thereto (preferably at the geometrical center of the polygon) so that, during each operating cycle, every potential direction of incidence stands at least once at right angles to the connecting line of at least one antenna pair. If, at that particular instance, incoming wave energy arrives cophasally at the two antennas of such pair, the direction of incidence is sharply defined. To this end it is merely necessary to let the antenna array oscillate through an arc not greater than the angular spacing of two adjacent receiving antennas (i.e. of two proximal corners of the polygon) although, if desired, a greater swing or, in fact, a unidirectional rotation—in steps or with continuous motion—may also be used.

If the incoming radiation consists of echoes of bursts of carrier frequency sent out by a transmitting antenna under the control of a conventional radar-pulse generator, the indicating elements selectively energizable by the several comparison circuits are advantageously in the form of a set of deflecting elements (preferably coils) for the beam of a cathode-ray tube serving as a panoramic display device. Only the deflector or deflectors associated with the responding comparison circuit are actuated while the beam remains suppressed, as in conventional radar receivers, until an echo pulse is received, the sweep circuit of the cathode-ray tube being synchronized with the radar-pulse generator so that the radial displacement of the luminous trace from a point of origin (generally on the tube axis) represents the distance of the reflecting object. If the deflecting elements are coils, they can be conveniently mounted outside the tube for rotation about the beam axis in step with the rotary motion of the receiving-antenna array. Such an arrangement will also be useful if the polygonal array of receiving antennas is replaced by a single antenna pair.

The invention will be described in greater detail with reference to the accompanying drawing in which.

Figure 1:
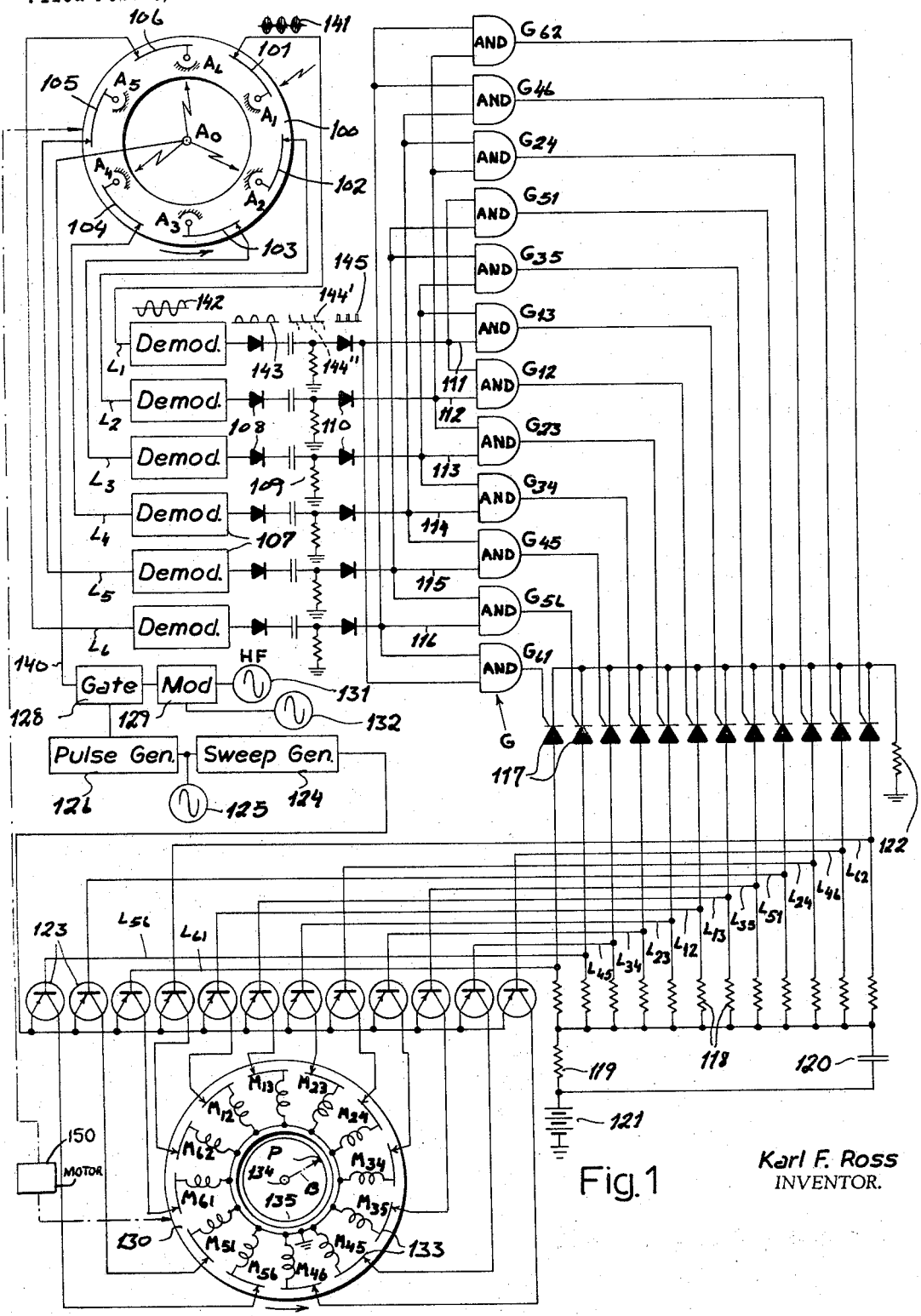
FIG. 1 is a circuit diagram of a radiolocation system embodying my invention.

In FIG. 1, I have illustrated an antenna assembly including a single omnidirectional transmitting antenna $A_0$ and six receiving antennas $A_1$ to $A_6$, the latter defining the corners of a polygon (here a regular hexagon) centered on aerial $A_0$. The receiving antennas $A_1$ to $A_6$ are mounted on a rotatable annular platform 100 provided with six slip rings 101, 102, 103, 104, 105, 106 (located, if desired, at different levels and indicated only in part) which are respectively connected to the several receiving antennas and establish a permanent connection between these antennas and six transmission lines $L_1$ to $L_6$. These transmission lines terminate at respective demodulators 107 whose outputs are rectified by diodes 108 and subsequently differentiated by circuits 109 shown diagrammatically as resistance-capacitance networks. The resulting pulses, of a given polarity selected by further diodes 110, travel over respective conductors 111 to 116 each leading to a respective pair of AND gates generally designated G.

In the hexagonal antenna array illustrated, the six sides of the hexagon are imaginary lines extending between six "ortho" pairs of antennas, i.e. pairs of immediately adjacent antennas $A_1$–$A_2$, $A_2$–$A_3$ etc. Each antenna is also paired with each of its neighbors once removed, i.e. $A_1$–$A_3$, $A_2$–$A_4$ etc., to define six "meta" pairs interconnected by imaginary lines which constitute the six chords of the hexagon. There exist also three further or "para" pairs, i.e. the antennas $A_1$–$A_4$, $A_2$–$A_5$ etc. disposed on diametrically opposite corners of the hexagon, but these latter pairs are not utilized in the system of FIG. 1 inasmuch as their imaginary connecting lines, i.e. the several diameters of the polygon, are parallel to respective sides thereof and thus do not establish separate directions of incidence. The six ortho pairs, and therefore the directions of incidence associated therewith, are relatively staggered by 60°, as are the six meta pairs, yet the six ortho pairs are offset from the six meta pairs by 30° so that the twelve antenna pairs define as many different directions with 30° spacing. In a given position of platform 100, accordingly, the angles of incidence included with a chosen reference direction (e.g. a horizontal line in FIG. 1) will represent azimuths of, say 15°, 45°, 75° etc.; upon a rotation of platform 100 through 30°, or a swing of ±15° from that given position, the entire horizon can be scanned. If only the ortho or the meta pairs were considered, this arc of swing or unidirectional rotation would have to be doubled. To avoid ambiguities, each antenna $A_1$ to $A_6$ is shielded against reception of waves from the side facing the center of the array whereby, incidentally, direct transmission from antenna $A_0$ to these receiving antennas is also prevented. In fact, each receiving antenna need have a pattern of reception extending only over an angle of 120° corresponding to $\pm 2\pi/n$ (where $n$, here equal to 6, is the number of such antennas) although its principal lobe may have an effective width of up to 180°.

Each of the twelve AND gates G is connected to the outputs of a respective ortho or meta pair of receiving antennas as indicated by their two-digit subscripts; thus, gate $G_{12}$ receives energy from antennas $A_1$ and $A_2$ (an ortho pair) whereas gate $G_{46}$ is energized by antennas $A_4$ and $A_6$ (a meta pair). These AND gates work into respective electronic switching devices 117, shown as solid controlled rectifiers, whose output leads are connected through individual resistors 118 and a common biasing resistor 119, bridged by a condenser 120, to a source of operating voltage here shown as the positive pole of a battery 121. A common cathode resistor 122 prevents the tripping of a second switch 117 after one of them has become conductive.

The anodes of controlled rectifiers 117 are also connected to respective leads $L_{12}$, $L_{13}$, $L_{23}$ etc. (twelve in all) whose subscripts correspond to those of the associated AND gates G. These leads terminate at the bases of respective transistors 123 whose emitters are energized by a sawtooth voltage from a sweep generator 124 controlled, in turn, by a timing oscillator 125. The latter also steps a pulse generator 126 which periodically unblocks a gate 128 for the passage of a modulated high-frequency wave produced by a modulator 129; a carrier-wave oscillator 131 and a low-frequency oscillator 132 work into this modulator to generate bursts of UHF radiation fed from the output of gate 128 via a conductor 140 to transmitting aerial $A_0$. It is assumed that the wavelength of the operating frequency of carrier-wave oscillator 131 is short compared with the sides of the polygonal antenna array but that the wavelength of the modulation generated by oscillator 132 is greater than the length of the chords $A_1$–$A_3$, $A_2$–$A_4$ of the polygon.

Another rotatable annular platform 130, synchronized with platform 100 for concurrent unidirectional rotation under the control of suitable drive means 150 as symbolized by the arrows, carries a set of twelve deflecting coils $M_{12}$, $M_{13}$, $M_{23}$, $M_{24}$ etc. whose subscripts correspond to those of the associated gates G and their output leads $L_{12}$, $L_{13}$ etc. Slip rings 133 (illustrated only in part) permanently connect these deflecting coils between negative battery (ground) and the collectors of the corresponding transistors 123. The coils around an electron gun 134 of a cathode-ray tube 135. The coils $M_{12}$ etc. are shown spaced 30° apart around the tube axis, yet in practice each of these coils may be formed as a conventional yoke consisting of two aligned windings on opposite sides of that axis (see FIG. 3, described below); in fact, diametrically opposite coils (such as $M_{13}$ and $M_{46}$) may be constituted by a single winding or pair of windings alternately traversable by current in opposite directions, depending upon which of the associated transistors 123 is conductive (i.e. whether a pulse appears on, say, lead $L_{13}$ or $L_{46}$).

Figure 2:
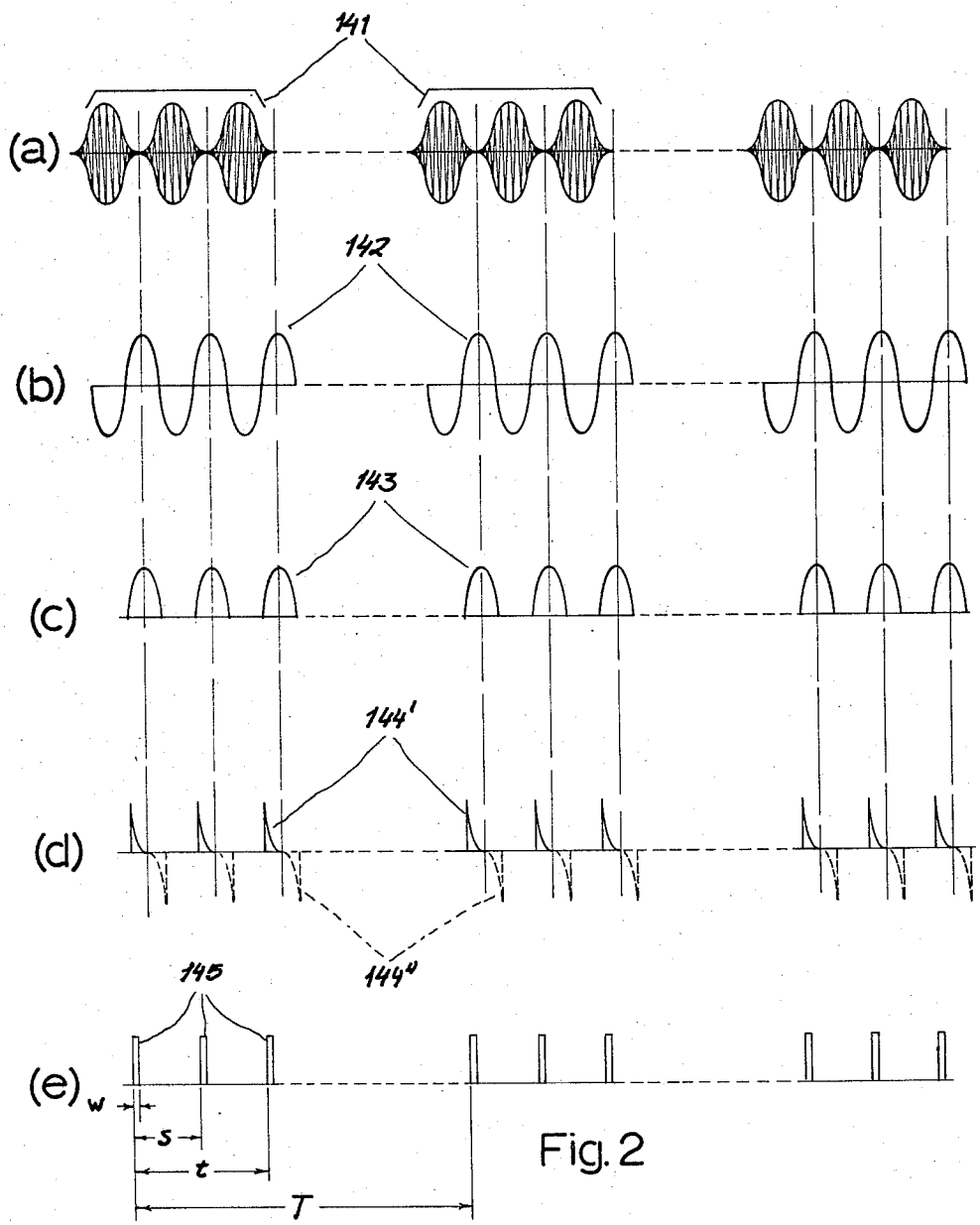
FIG. 2 is a set of graphs illustrating the mode of operation of the system of FIG. 1.

The operation of the system shown in FIG. 1 will now be described with reference to the several graphs of FIG. 2. Graph (a) shows a train of pulses 141 of an amplitude modulated carrier wave as applied through lead 140 to transmitting antenna $A_0$ and as subsequently received, upon external reflection, by the demodulators 107 via the respective lines $L_1$ to $L_6$. Graph (b) indicates similar pulses 142 of the lower-frequency oscillation from generator 132 as obtained in the outputs of these demodulators. Graph (c) illustrates alternate half-cycles (here positive) 143 of oscillation 142 as selected by diodes 108. Graph (d) shows an alternation of positive pulses 144' and negative pulses 144'' as derived from half-cycles 143 by the differentiation circuits 109, the negative pulses 144'' (dotted lines) being suppressed by diodes 110 so that only the pulses 144' ultimately reach the leads 111–116. The system may also include special pulse shapers (not shown), either before or after the diodes 110, to make the positive gating pulses emerge with a predetermined amplitude and width as indicated at 145 in graph (e) of FIG. 2; the width $w$ of these gating pulses should be small compared to their spacing $s$. The pulse trains shown in FIG. 2 have also been reproduced, on a smaller scale, in FIG. 1.

The gating pulses 145 on leads 111–116 will generally be staggered within the interval $s$ to an extent which varies as the antenna system rotates through an arc of 30°, this rotation occurring during a time substantially longer than the pulse-repetition period $T$ so that a multiplicity of pulses 141 will be transmitted and received in the course thereof. At some point of a cycle $T$, an echo pulse from an external object will arrive in a direction exactly or almost exactly perpendicular to an imaginary line (side or chord of the hexagon) interconnecting two paired receiving antennas, e.g. the antennas $A_1$ and $A_2$, so that the reflected wave energy travels the same distance from that object to the two antennas and the resulting outputs on the associated lines $L_1$ and $L_2$ are in phase. This means that the respective gating pulses on conductors 111 and 112 coincide, or at least overlap to a substantial extent, so that the AND gate $G_{12}$ common to these two conductors responds and energizes these corresponding switch 117. Positive voltage from battery 121, applied to the bases of transistors 123 through resistors 118 and 119, normally keeps these transistors cut off; with conduction established through the associated switch 117, lead $L_{12}$ is now biased more negatively so that the corresponding transistors 123 is turned on and coil $M_{12}$ carries current of a magnitude determined by the instantaneous value of the output voltage 146 of sawtooth generator 124 whose fundamental frequency equals the cadence $1/T$ of pulses 141. This magnetizing current deflects the beam B in a direction perpendicular to the coil axis, as indicated in dot-dash lines, and to an extent depending on the current amplitude; such deflection, however, will be of short duration since the discharge of condenser 120 quenches the conductive switch 117 after an interval determined by the time constant of network 119, 120. Advantageously, to insure maximum utilization of the operating period $T$ of timing oscillator 125, that interval should be of a length substantially equaling the duration t of a pulse 141 which, as indicated in FIG. 2, is large compared with the wavelength of signal modulation 142 but small in comparison with period T; the latter, in turn, should equal or exceed the transit time of a pulse to and from a reflecting object at maximum range. Thus, as in conventional radar, the distance of the luminous point P (i.e. the trace of beam B on the screen of tube 135) from the tube axis is a measure of the distance of the object from the antenna array. Owing to the relatively great length of period T compared with interval t, the position of luminous spot P on the screen will not shift perceptibly during that interval.

The blocking of all other switches 117, by means of biasing resistor 122, upon the temporary activation of one of these switches prevents the concurrent energization of several coils $M_{12}$ etc. which could otherwise occur in response to echoes from two or more substantially equidistant objects spaced apart 30° or a multiple thereof; such concurrent energization would tend to deflect the beam B in an intermediate direction, not corresponding to the azimuth any of the reflecting objects, and would therefore give a false indication. In this relatively rare event the slightly more distant objects will be blanked out on the screen of tube 135 until either the relative distance or the azimuthal relationship of the two or more objects has changed sufficiently to produce individual responses.

Figure 3:
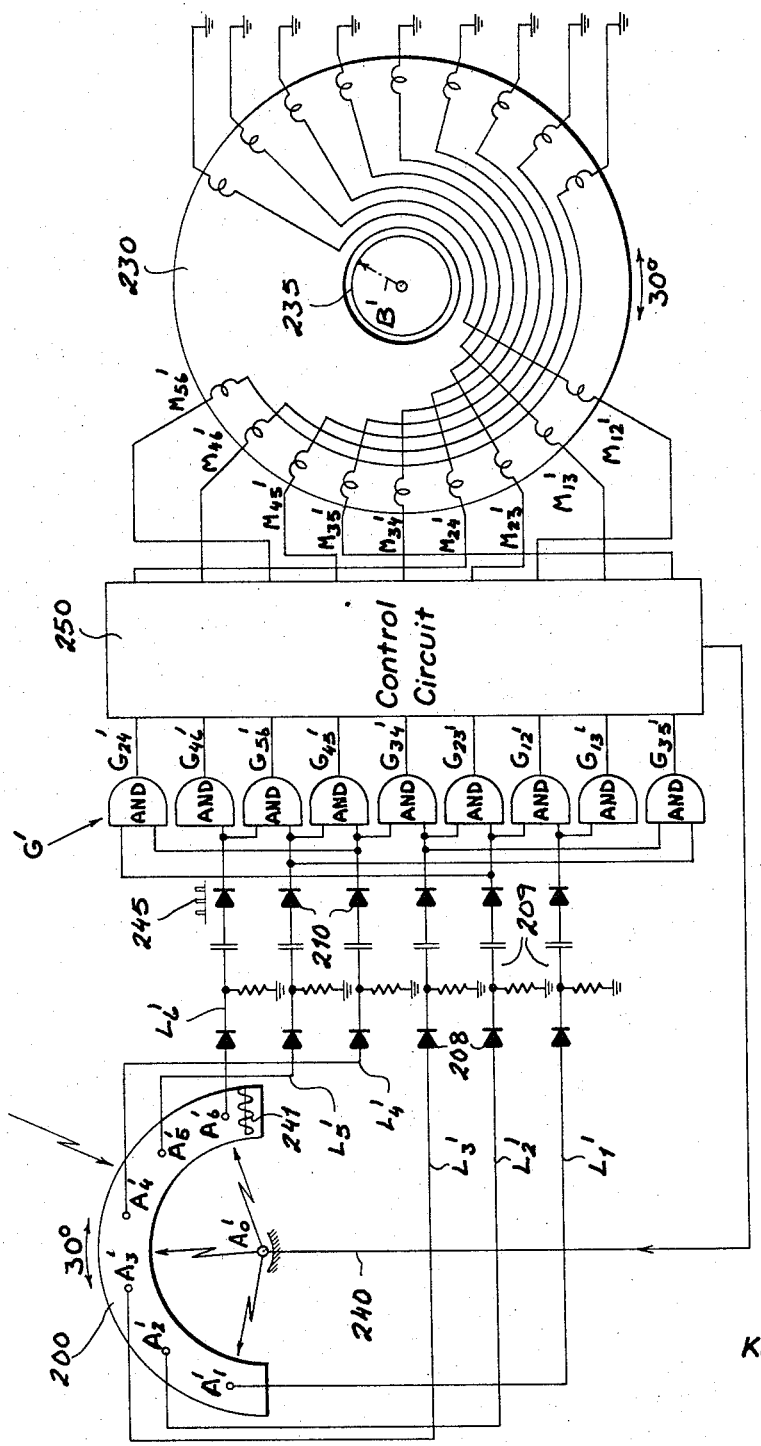
FIG. 3 is a circuit diagram similar to FIG. 1, showing a modification of that system.

In FIG. 3 I have shown a modified system with a transmitting antenna $A_0'$ and an array of receiving antennas $A_1'$ to $A_6'$ defining one half of a twelve-sided regular polygon. A semiannular platform 200, bearing the receiving antennas, is swingable through an arc of 30°, i.e. ±15° from the illustrated starting position, about the antenna $A_0'$ whose radiation pattern has an effective width of approximately 180°; the same swing is imparted, by suitable drive means not shown, to an annular platform 230 centered on a cathode-ray tube 235. The antennas $A_1'$ to $A_6'$, which may be omnidirectional, form five ortho pairs pairs $A_1'-A_2'$ etc. and four meta pairs $A_1'-A_3'$ etc.; thus, their output leads $L_1'$ to $L_6'$ work into nine AND gates G', individually designated $G_{12}'$, $G_{13}'$, $G_{23}'$ etc., via respective differentiation circuits 209 and diodes 208, 210. A control circuit 250, representing the elements 117–122, 124–126 etc. of FIG. 1, has an output lead 240 which supplies a pulsed carrier wave 241 to transmitting antenna $A_0'$; if, as here assumed, the wavelength of this carrier is larger than the length of the chords such as $A_1'-A_3'$ of the polygon, no modulator and demodulators (as shown at 129 and 107 in FIG. 1) need be provided.

The AND G' selectively energize, through the intermediary of control circuit 250 as heretofore described, nine electromagnetic deflecting elements $M_{12}'$, $M_{13}'$, etc. for the beam B' of cathode-ray tube 235, each element being here shown as a two-coil yoke straddling the tube axis. These deflectors are spaced 15° apart which corresponds to the angular spacing of the several directions of incidence defined by the nine antenna pairs referred to above; the arc scanned by the antenna array, in the course of its 30° swing, thus extends over 165°, this being also the range of deflection of the beam B' by the oscillating coil system $M_{12}'$ etc. Thus, there is no possibility of an ambiguity due to potential incidence of radiation from two directions 180° apart.

The system shown in FIG. 3 operates otherwise in the same manner as that of FIG. 1. With incoming radiation perpendicular to, say, the side of the polygon defined by antennas $A_4'$ and $A_5'$ (thus including an angle of 60° with a horizontal line in FIG. 3), cophasal carrier waves 241 on leads $L_4'$ and $L_5'$ give rise to coincident pulses 245 at the inputs of AND gate $G_{45}'$ with resulting energization of coil pair $M_{45}'$ and corresponding deflection of beam B' at 60° to the horizontal. Generally, the antenna arrays of FIGS. 1 and 3 may be assumed to lie in a horizontal plane (though its orientation could also be different) whereas the screens of cathode-ray tubes 135 and 235 may be vertical for convenience, a horizontal reference line on the screen thus representing a vertical reference plane (0° azimuth) through the center of the array.

If, contrary to the relationships described, the wavelength of a signal 142 or 241 fed to the phase-comparison circuits 108 etc. or 208 etc. were equal to the length of a chord of the array, or to an aliquot fraction of that length, ambiguity and malfunction could occur. Thus, the incoming wave shown in FIG. 1, bisecting the line $A_1-A_2$, would simulate a cophasal relationship between the outputs of antennas $A_1$ and $A_5$ (as well as $A_2$ and $A_4$) so that coil $M_{51}$ or $M_{24}$ might be energized in preference to the correct coil $M_{12}$; in FIG. 3, similarly, spurious energization of coils $M_{13}'$ instead of coils $M_{45}'$ could come about because of a pseudo-cophasality of the outputs of antennas $A_1'$ and $A_3'$ under similar circumstances.

I claim:

1. A radiolocation system comprising a polygonal array of parallel receiving antennas responsive to incoming wave energy from a distant object, a plurality of comparison circuits each connected to a respective pair of said antennas for determining a matching phase relationship between the respective output voltages thereof due to said incoming wave energy, and indicator means including a plurality of elements respectively connected to said comparison circuits for selective energization thereby upon detection of a matching phase relationship, such energization establishing the location of said distant object as substantially in a plane bisecting an imaginary line which interconnects the associated antenna pair.

2. A system as defined in claim 1, further comprising drive means for rotating said array at least through an arc substantially equal to the angular spacing of adjacent receiving antennas, said drive means being coupled with said indicator means for varying the output thereof in step with the rotation of said array.

3. A system as defined in claim 2 wherein said indicator means comprises a cathode-ray tube and said elements are a set of radially disposed deflecting coils for the beam of said tube, said coils being mounted for rotation about the tube axis by said drive means.

4. A system as defined in claim 3, further comprising a transmitting antenna, pulse-generator means coupled to said transmitting antenna for energizing same to emit a train of radar pulses reflectable by said object to said array, a sweep circuit for said coils coupled to said pulse-generator means for impressing upon said coils a magnetizing voltage varying with a fundamental frequency equal to the cadence of said pulses, and blocking means individual to said coils for effectively disconnecting same from said sweep circuit under the control of the respective comparison circuits except in the presence of said matching phase relationship whereby said beam produces a luminous spot at a location whose distance from said axis and angular displacement from a reference direction respectively represent the range and the azimuthal orientation of the reflecting object.

5. A system as defined in claim 1, further comprising a transmitting antenna juxtaposed with said array and connected to a source of radar pulses to be reflected by said object, said indicator means including circuit means responsive to energization of one of said elements for blocking all other of said elements during an interval substantially equaling the length of a reflected radar pulse.

6. A system as defined in claim 1, further comprising a transmitting antenna positioned substantially at the center of said array for approximately uniform pulse emission over at least a sector of about 180°.

7. A system as defined in claim 6 wherein said pulses are bursts of a carrier wave whose wavelength is a fraction of the spacing of any two of said receiving antennas, further comprising modulating means coupled to said source for impressing upon said carrier wave a modulation with a wavelength greater than the largest spacing of any paired antennas of said array but corresponding to a period less than the pulse duration, and demodulator means in said comparison circuits for deriving phase signals from said modulation, said comparison circuits further including coincidence gates responsive to said phase signals.

8. A system as defined in claim 6, further comprising drive means for rotating said array about said transmitting antenna through an arc substantially equal to the minimum angular offset of any two pairs of receiving antennas at a rate enabling the emission of a multiplicity of radar pulses during a swing through said arc, said drive means being coupled with said indicator means for varying the output thereof in step with the rotation of said array.

9. In a radiolocation system, in combination, at least one pair of parallel receiving antennas adapted to receive high-frequency wave energy with at least a frequency component of a wavelength greater than the spacing of said antennas, indicator means including a source of an electron beam, deflecting means for said beam, means for rotating said pair of antennas about an axis parallel thereto and in step with a rotation of said deflecting means about said source, a comparison circuit connected to said antennas, circuit means coupled to said comparison circuit for ascertaining the existence of a momentary cophasal realtionship of said frequency component of incoming wave energy as received by said antennas, transmitting means for sending out radar pulses in the form of periodic bursts of said high-frequency wave energy, a sweep circuit for said deflecting means having a fundamental frequency equal to the recurrence period of said pulses, and blocking means controlled by said circuit means interposed between said sweep circuit and said deflecting means for preventing energization of the latter by said sweep circuit except in the presence of said cophasal relationship.

10. The combination defined in claim 9 wherein said indicator means comprises a cathode-ray tube, said deflecting means including a coil disposed outside said tube for rotation about the axis thereof.

References Cited
UNITED STATES PATENTS

| | | | |
|---|---|---|---|
| 2,544,355 | 3/1951 | Richmond | 343—11 |
| 2,808,583 | 10/1957 | Mathes | 343—113 |
| 3,104,391 | 9/1963 | Hansel | 343—113 |
| 3,341,807 | 9/1967 | Lobdell | 343—11 X |

RODNEY D. BENNETT, *Primary Examiner.*

M. F. HUBLER, *Assistant Examiner.*